US012603412B2

(12) United States Patent
Chang et al.

(10) Patent No.: US 12,603,412 B2
(45) Date of Patent: Apr. 14, 2026

(54) MOBILE DEVICE SUPPORTING WIDEBAND OPERATION

(71) Applicant: Acer Incorporated, New Taipei City (TW)

(72) Inventors: Kun-Sheng Chang, New Taipei City (TW); Ching-Chi Lin, New Taipei City (TW); Chuan-Chun Wang, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 217 days.

(21) Appl. No.: 18/535,305

(22) Filed: Dec. 11, 2023

(65) Prior Publication Data

US 2025/0125515 A1 Apr. 17, 2025

(30) Foreign Application Priority Data

Oct. 17, 2023 (TW) ................................ 112139511

(51) Int. Cl.
*H01Q 1/22* (2006.01)
*H01Q 1/48* (2006.01)
(Continued)

(52) U.S. Cl.
CPC ............. *H01Q 1/2266* (2013.01); *H01Q 1/48* (2013.01); *H01Q 5/20* (2015.01); *H01Q 5/35* (2015.01); *H01Q 13/10* (2013.01)

(58) Field of Classification Search
CPC .... H01Q 1/243; H01Q 1/2266; H01Q 1/2258; H01Q 13/10; H01Q 5/20; H01Q 21/30; H01Q 1/48; H01Q 5/35
See application file for complete search history.

(56) References Cited

U.S. PATENT DOCUMENTS 9,843,092 B2 12/2017 Tu
10,498,041 B1 * 12/2019 Lin ........................ H01Q 13/16
(Continued)

FOREIGN PATENT DOCUMENTS

CN 110690555 A 1/2020
TW 201739234 A 11/2017
(Continued)

OTHER PUBLICATIONS

Chinese language office action dated Nov. 11, 2024, issued in application No. TW 112139511.

*Primary Examiner* — Hoang V Nguyen
*Assistant Examiner* — Anna N Hamadyk
(74) *Attorney, Agent, or Firm* — McClure, Qualey & Rodack, LLP

(57) ABSTRACT

A mobile device supporting wideband operations includes a first metal mechanism element, a dielectric substrate, a first feeding radiation element, a second feeding radiation element, a ground element, and a second metal mechanism element. The first metal mechanism element includes a main portion and a sidewall portion. The sidewall portion of the first metal mechanism element has a first slot. Both the first feeding radiation element and the second feeding radiation element extend across the first slot of the first metal mechanism element. An antenna structure is formed by the first slot of the first metal mechanism element, the dielectric substrate, the first feeding radiation element, the second feeding radiation element, and the ground element. The second metal mechanism element is disposed opposite to the main portion of the first metal mechanism element. The second metal mechanism element has a second slot.

17 Claims, 7 Drawing Sheets

(51) Int. Cl.
*H01Q 5/20* (2015.01)
*H01Q 5/35* (2015.01)
*H01Q 13/10* (2006.01)

(56) References Cited

U.S. PATENT DOCUMENTS

| | | | | |
|---|---|---|---|---|
| 11,450,959 | B2 | 9/2022 | Chang | |
| 11,588,245 | B2 | 2/2023 | Wei | |
| 2017/0309993 | A1 * | 10/2017 | Tu | H01Q 13/10 |
| 2020/0076049 | A1 * | 3/2020 | Chang | H01Q 5/378 |
| 2020/0168993 | A1 * | 5/2020 | Wei | H01Q 1/24 |
| 2020/0185813 | A1 * | 6/2020 | Chang | H01Q 1/48 |
| 2025/0055199 | A1 * | 2/2025 | Chen | H01Q 1/243 |

FOREIGN PATENT DOCUMENTS

| | | | |
|---|---|---|---|
| TW | 202021188 | A | 6/2020 |
| TW | 202147691 | A | 12/2021 |
| TW | 202213859 | A | 4/2022 |

* cited by examiner

700

MOBILE DEVICE SUPPORTING WIDEBAND OPERATION

CROSS REFERENCE TO RELATED APPLICATIONS

This application claims priority of Taiwan Patent Application No. 112139511 filed on Oct. 17, 2023, the entirety of which is incorporated by reference herein.

BACKGROUND OF THE INVENTION

Field of the Invention

The disclosure generally relates to a mobile device, and more particularly, to a mobile device that supports wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a first metal mechanism element, a dielectric substrate, a first feeding radiation element, a second feeding radiation element, a ground element, and a second metal mechanism element. The first metal mechanism element includes a main portion and a sidewall portion. The sidewall portion of the first metal mechanism element has a first slot. The dielectric substrate is adjacent to the sidewall portion of the first metal mechanism element. The first feeding radiation element is coupled to a feeding point. The first feeding radiation element extends across the first slot of the first metal mechanism element. The second feeding radiation element is coupled to the feeding point. The second feeding radiation element extends across the first slot of the first metal mechanism element. The first feeding radiation element and the second feeding radiation element are disposed on the dielectric substrate. The ground element is coupled to the main portion of the first metal mechanism element. An antenna structure is formed by the first slot of the first metal mechanism element, the dielectric substrate, the first feeding radiation element, the second feeding radiation element, and the ground element. The second metal mechanism element is disposed opposite to the main portion of the first metal mechanism element. The second metal mechanism element has a second slot.

In some embodiments, the first slot of the first metal mechanism element is a first closed slot. The second slot of the second metal mechanism element is a second closed slot. The first closed slot and the second closed slot are substantially parallel to each other.

In some embodiments, an angle is formed between the first feeding radiation element and the second feeding radiation element. The angle is from 30 to 90 degrees.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the length of the first slot of the first metal mechanism element is substantially equal to 0.5 wavelength of the first frequency band.

In some embodiments, the length of the second slot of the second metal mechanism element is substantially equal to 0.5 wavelength of the first frequency band.

In some embodiments, the length of the first feeding radiation element is substantially equal to 0.25 wavelength of the third frequency band.

In some embodiments, the length of the second feeding radiation element is substantially equal to 0.25 wavelength of the third frequency band.

In some embodiments, the mobile device further includes a nonconductive support element for filling the first slot of the first metal mechanism element. The nonconductive support element is configured to carry the dielectric substrate.

In some embodiments, the second metal mechanism element further has a cutting retraction design, which is not parallel to the main portion of the first metal mechanism element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
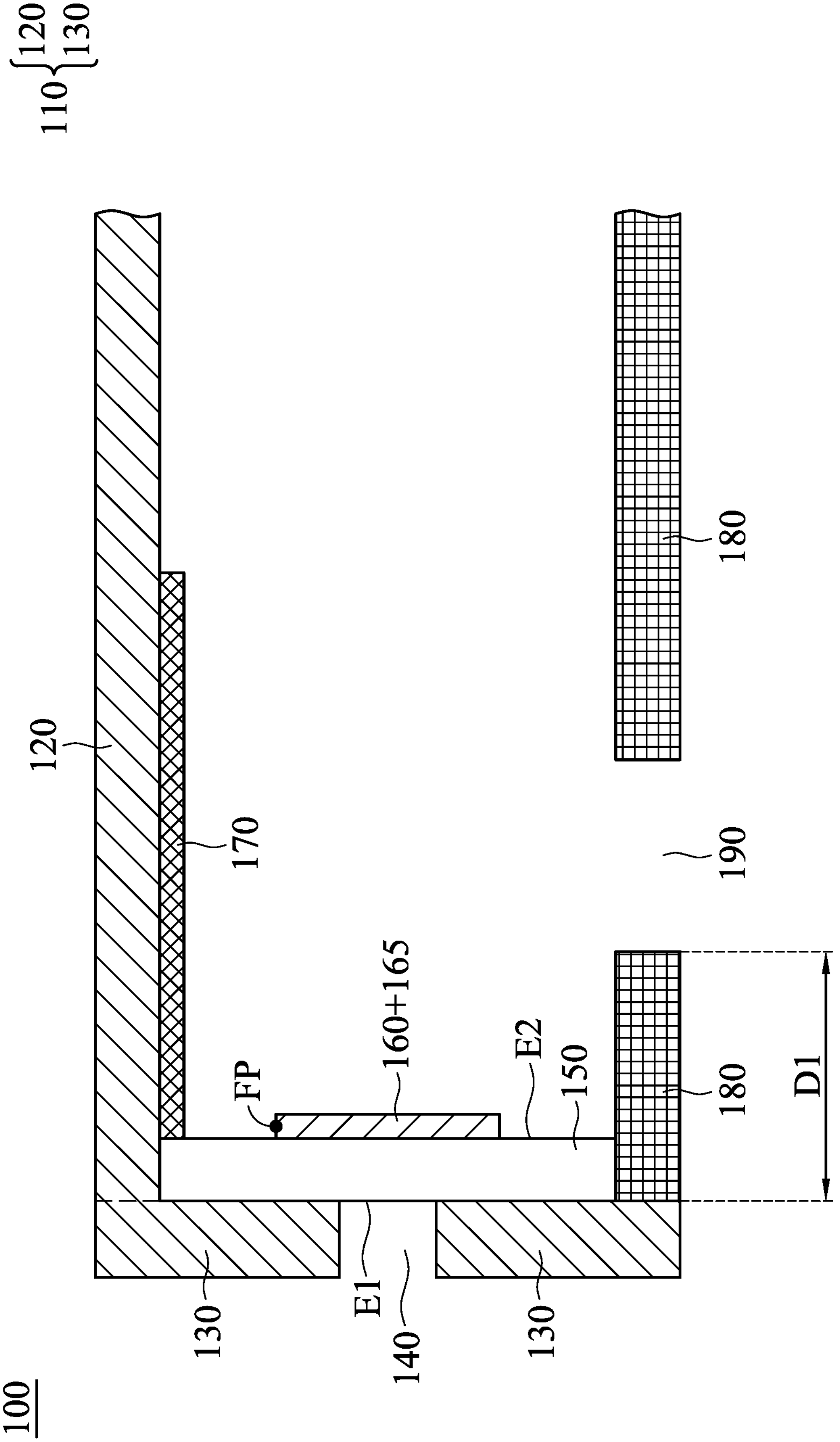
FIG. 1 is a sectional view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a sectional view of a mobile device 100 according to an embodiment of the invention. For example, the mobile device 100 may be a smartphone, a tablet computer, or a notebook computer. As shown in FIG. 1, the mobile device 100 includes a first metal mechanism element 110, a dielectric substrate 150, a first feeding radiation element 160, a second feeding radiation element 165, a ground element 170, and a second metal mechanism element 180. The first feeding radiation element 160, the second feeding radiation element 165, and the ground element 170 may all be made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

The first metal mechanism element 110 includes a main portion 120 and a sidewall portion 130. The main portion 120 and the sidewall portion 130 may be substantially perpendicular to each other. The sidewall portion 130 of the first metal mechanism element 120 may have a first slot 140. It should be noted that the first metal mechanism element 110 and the second metal mechanism element 180 may be appearance elements of the mobile device 100, that is, the elements which eyes of a user can directly observe.

Figure 2:
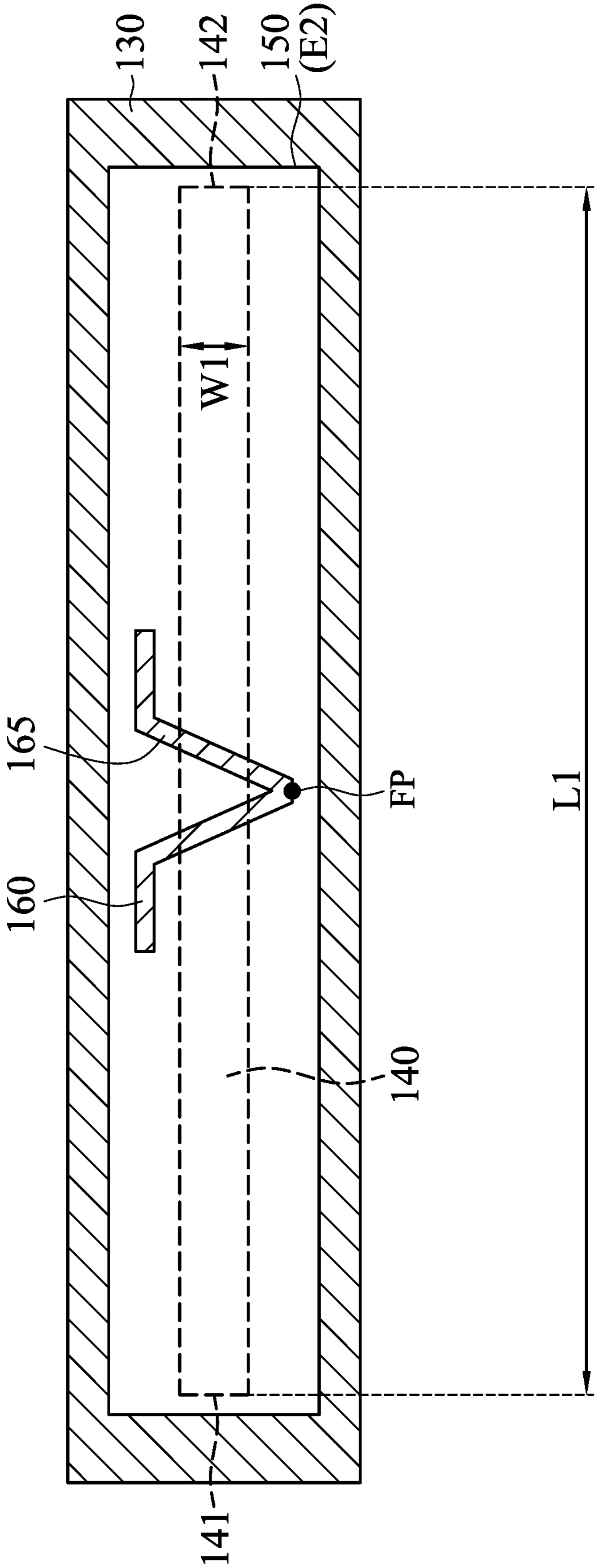
FIG. 2 is a partial view of a mobile device according to an embodiment of the invention.
Figure 3:
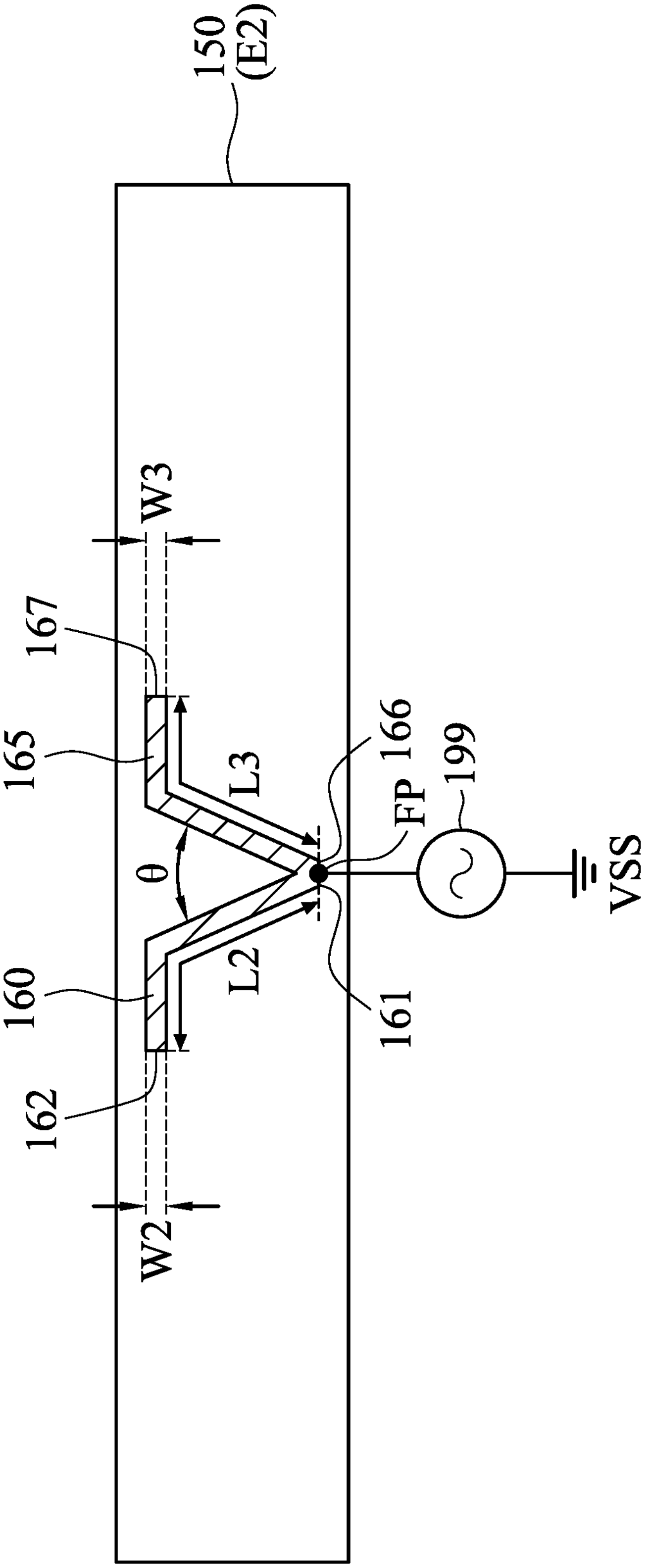
FIG. 3 is another partial view of a mobile device according to an embodiment of the invention.

FIG. 2 is a partial view of the mobile device 100 according to an embodiment of the invention. FIG. 3 is another partial view of the mobile device 100 according to an embodiment of the invention. Please refer to FIG. 1, FIG. 2, and FIG. 3 together. The first slot 140 of the first metal mechanism element 110 may be a first closed slot with a first closed end 141 and a second closed end 142 away from each other. In addition, the first slot 140 of the first metal mechanism element 110 may substantially have a straight-line shape. However, the invention is not limited thereto. In alternative embodiments, the first slot 140 of the first metal mechanism element 110 substantially has a meandering shape, such as an L-shape, a W-shape, or an N-shape.

For example, the dielectric substrate 150 may be an FR4 (Flame Retardant 4) substrate, a PCB (Printed Circuit Board), or a FPC (Flexible Printed Circuit). The dielectric substrate 150 has a first surface E1 and a second surface E2 which are opposite to each other. The first surface E1 of the dielectric substrate 150 is adjacent to the sidewall portion 130 of the first metal mechanism element 110. Both of the first feeding radiation element 160 and the second feeding radiation element 165 are disposed on the second surface E2 of the dielectric substrate 150. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). In some embodiments, the first surface E1 of the dielectric substrate 150 is directly attached to the sidewall portion 130 of the first metal mechanism element 110, such that the dielectric substrate 150 can at least partially cover the first slot 140 of the first metal mechanism element 110.

The first feeding radiation element 160 may substantially have an L-shape. Specifically, the first feeding radiation element 160 has a first end 161 and a second end 162. The first end 161 of the first feeding radiation element 160 is coupled to a feeding point FP. The second end 162 of the first feeding radiation element 160 is an open end. The feeding point FP may be further coupled to a signal source 199. For example, the signal source 199 may be an RF (Radio Frequency) module. In some embodiments, the first feeding radiation element 160 can extend across the first slot 140 of the first metal mechanism element 110. That is, the first feeding radiation element 160 has a first vertical projection on the sidewall portion 130 of the first metal mechanism element 110, and the first vertical projection at least partially overlaps the first slot 140 of the first metal mechanism element 110.

The second feeding radiation element 165 may substantially have an inverted L-shape. Specifically, the second feeding radiation element 165 has a first end 166 and a second end 167. The first end 166 of the second feeding radiation element 165 is coupled to the feeding point FP. The second end 167 of the second feeding radiation element 165 is an open end. For example, the second end 167 of the second feeding radiation element 165 and the second end 162 of the first feeding radiation element 160 may substantially extend in opposite directions and away from each other. In some embodiments, the second feeding radiation element 165 can extend across the first slot 140 of the first metal mechanism element 110. That is, the second feeding radiation element 165 has a second vertical projection on the sidewall portion 130 of the first metal mechanism element

110, and the second vertical projection at least partially overlaps the first slot 140 of the first metal mechanism element 110. Furthermore, there can be an angle θ formed between the first feeding radiation element 160 and the second feeding radiation element 165. For example, the aforementioned angle θ may be an acute angle, but it is not limited thereto.

The ground element 170 is coupled to the main portion 120 of the first metal mechanism element 110. For example, the ground element 170 may be implemented with a ground copper foil. In a preferred embodiment, the antenna structure of the mobile device 100 is formed by the first slot 140 of the first metal mechanism element 110, the dielectric substrate 150, the first feeding radiation element 160, the second feeding radiation element 165, and the ground element 170.

Figure 4:
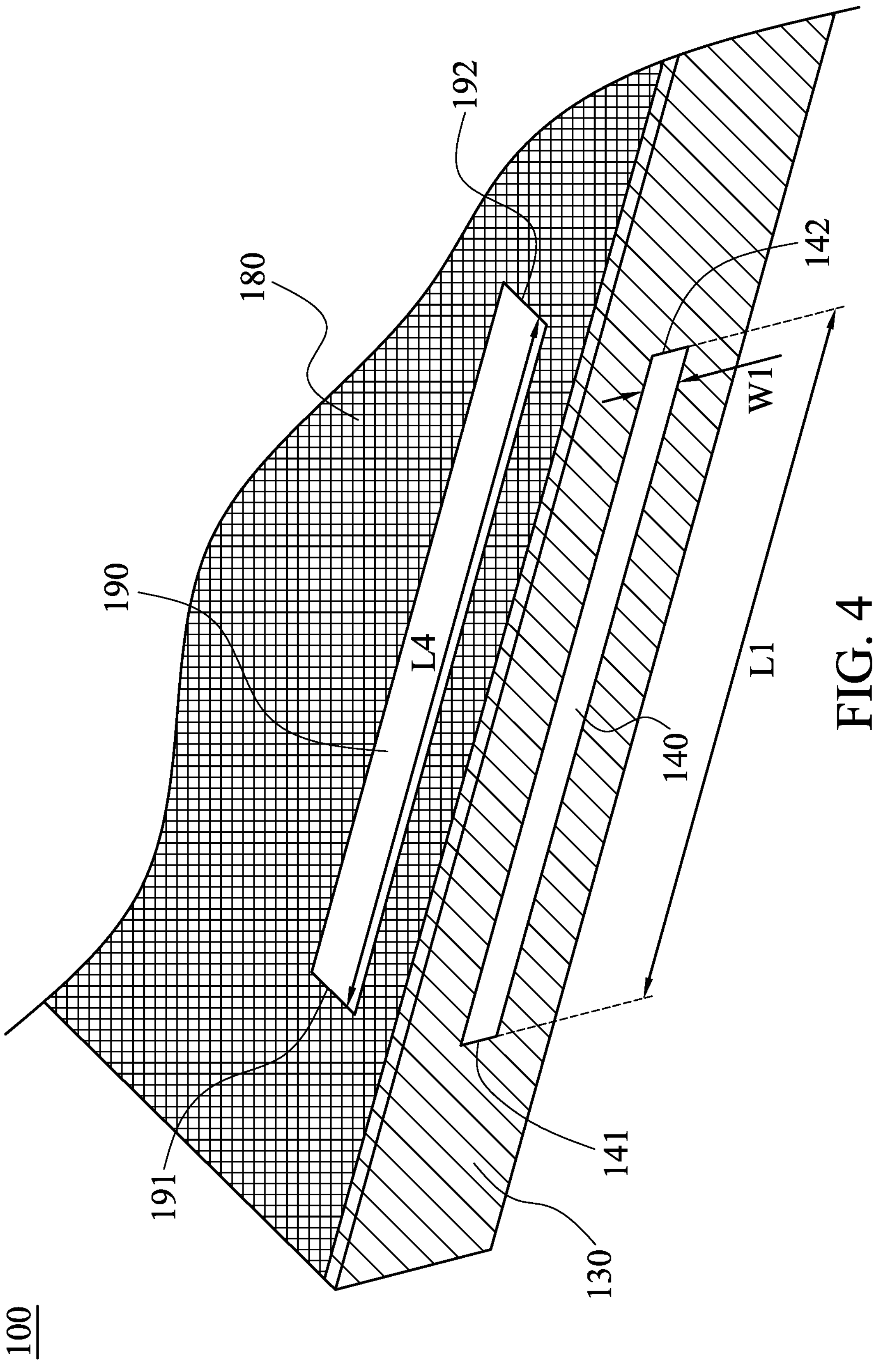
FIG. 4 is a perspective view of a mobile device according to an embodiment of the invention.

FIG. 4 is a perspective view of the mobile device 100 according to an embodiment of the invention. Please refer to FIG. 1 and FIG. 4 together. The second metal mechanism element 180 is disposed opposite to the main portion 120 of the first metal mechanism element 110. In some embodiments, if the mobile device 100 is a notebook computer, the first metal mechanism element 110 may be a keyboard frame, and the second metal mechanism element 180 may be a base housing. It should be understood that the aforementioned keyboard frame and base housing are equivalent to the so-called "C-component" and "D-component" in the field of notebook computers.

The second metal mechanism element 180 has a second slot 190. The second slot 190 of the second metal mechanism element 180 may be a second closed slot with a first closed end 191 and a second closed end 192 away from each other. In addition, the second slot 190 of the second metal mechanism element 180 may substantially have another straight-line shape, which may be substantially parallel to the first slot 140 of the first metal mechanism element 110. However, the invention is not limited thereto. In alternative embodiments, the second slot 190 of the second metal mechanism element 180 substantially has another meandering shape, such as another L-shape, another W-shape, or another N-shape. It should be noted that the second slot 190 of the second metal mechanism element 180 corresponds to the first slot 140 of the first metal mechanism element 110. Therefore, the antenna structure of the mobile device 100 can transmit or receive a wireless signal through the second slot 190 of the second metal mechanism element 180. In comparison to the conventional antenna window, the proposed mobile device 100 of the invention not only maintains good communication quality of the antenna structure but also significantly enhances the structural rigidity of the second metal mechanism element 180.

In some embodiments, the antenna structure of the mobile device 100 can cover a first frequency band, a second frequency band, and a third frequency band. For example, the first frequency band may be from 2400 MHz to 2500 MHz, the second frequency band may be from 5150 MHz to 5850 MHz, and the third frequency band may be from 5925 MHz to 7125 MHz. Therefore, the mobile device 100 can support at least the wideband operations of WLAN (Wireless Local Area Network), Wi-Fi 6E and Wi-Fi 7.

The operational principles of the antenna structure of the mobile device 100 in some embodiments are described as follows. The first slot 140 of the first metal mechanism element 110 can be excited to generate a fundamental resonant mode, thereby forming the aforementioned first frequency band. The first slot 140 of the first metal mechanism element 110 can be further excited to generate a first higher-order resonant mode, thereby forming the aforementioned second frequency band. The first slot 140 of the first metal mechanism element 110 can be further excited to generate a second higher-order resonant mode, thereby forming the aforementioned third frequency band. According to practical measurements, the first feeding radiation element 160 and the second feeding radiation element 165 are configured to fine-tune the impedance matching of the aforementioned third frequency band, thereby increasing the operational bandwidth thereof.

Figure 5:
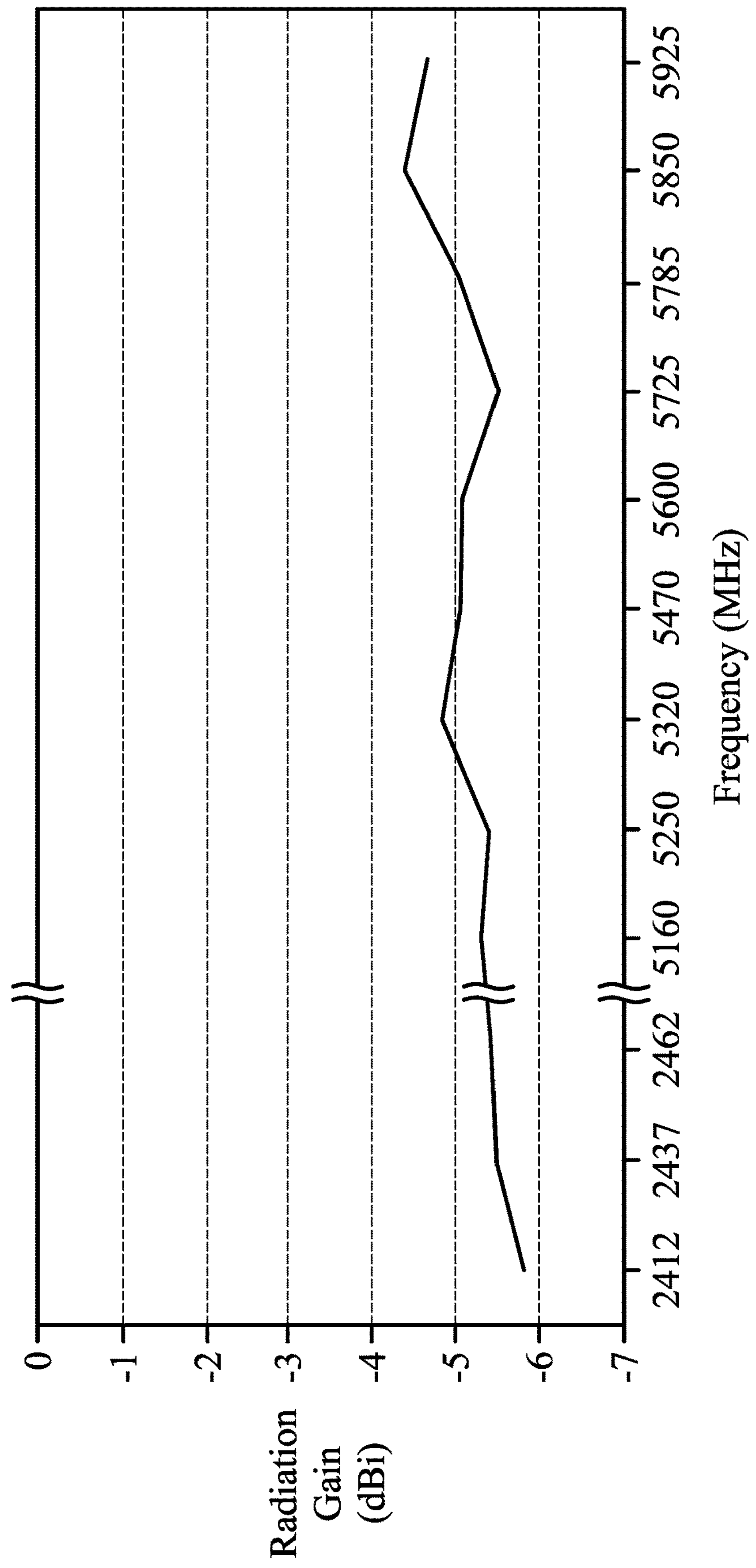
FIG. 5 is a diagram of radiation gain of the antenna structure of a mobile device according to an embodiment of the invention.

FIG. 5 is a diagram of radiation gain of the antenna structure of the mobile device 100 according to an embodiment of the invention. The horizontal axis represents the operational frequency (MHz), and the vertical axis represents the radiation gain (dBi). According to the measurement of FIG. 5, the radiation gain of the antenna structure of the mobile device 100 can reach at least-6 dBi within the aforementioned first and second frequency bands. It can meet the requirements of practical application of general mobile communication devices.

The element sizes of the mobile device 100 of some embodiments are described as follows. The length L1 of the first slot 140 of the first metal mechanism element 110 may be substantially equal to 0.5 wavelength (λ/2) of the first frequency band of the antenna structure of the mobile device 100. The width W1 of the first slot 140 of the first metal mechanism element 110 may be from 1 mm to 3 mm. The length L2 of the first feeding radiation element 160 may be substantially equal to 0.25 wavelength (λ/4) of the third frequency band of the antenna structure of the mobile device 100. The width W2 of the first feeding radiation element 160 may be from 0.5 mm to 1 mm. The length L3 of the second feeding radiation element 165 may be substantially equal to 0.25 wavelength (λ/4) of the third frequency band of the antenna structure of the mobile device 100. The width W3 of the second feeding radiation element 165 may be from 0.5 mm to 1 mm. The angle θ formed between the first feeding radiation element 160 and the second feeding radiation element 165 may be from 30 to 90 degrees, such as about 45 degrees, about 60 degrees, or about 75 degrees. The length L4 of the second slot 190 of the second metal mechanism element 180 may be substantially equal to 0.5 wavelength (λ/2) of the first frequency band of the antenna structure of the mobile device 100. The width W4 of the second slot 190 of the second metal mechanism element 180 may be from 3 mm to 5 mm. The distance D1 between the second slot 190 of the second metal mechanism element 180 and the sidewall portion 130 of the first metal mechanism element 110 may be from 4 mm to 6 mm. The above ranges of element sizes are calculated and obtained according to many experiment results, and they help to optimize the operational bandwidth and the impedance matching of the antenna structure of the mobile device 100.

The following embodiments will introduce different configurations and detail structural features of the mobile device 100. It should be understood that these figures and descriptions are merely exemplary, rather than limitations of the invention.

Figure 6:
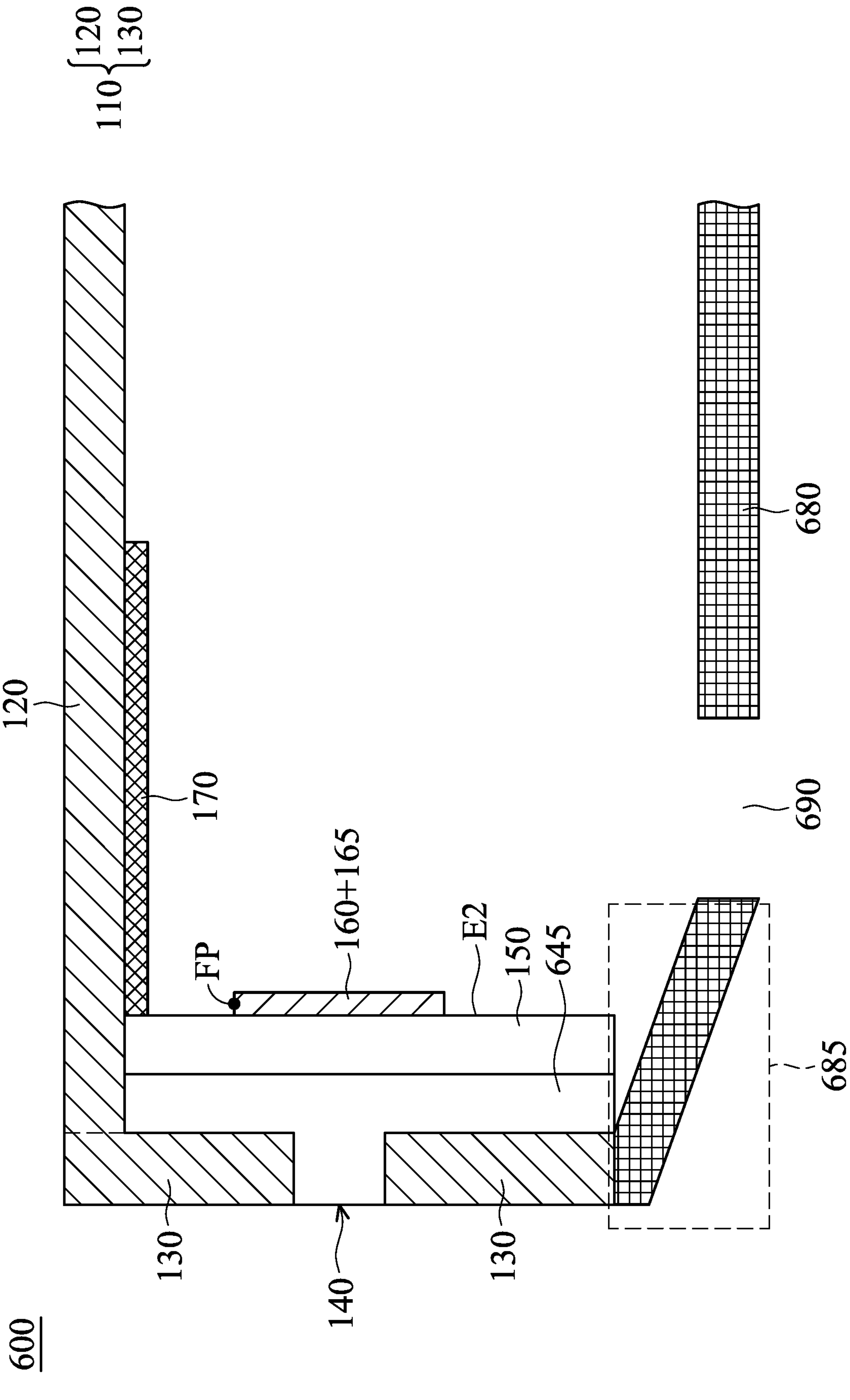
FIG. 6 is a sectional view of a mobile device according to an embodiment of the invention.

FIG. 6 is a sectional view of a mobile device 600 according to an embodiment of the invention. FIG. 6 is similar to FIG. 1. In the embodiment of FIG. 6, the mobile device 600 further includes a nonconductive support element 645. The nonconductive support element 645 is made of a plastic material, and it is disposed between the sidewall portion 130 of the first metal mechanism element 110 and the dielectric substrate 150. The nonconductive support element 645 can fill the first slot 140 of the first metal mechanism element 110. In addition, the nonconductive support element 645 is also configured to carry the dielectric substrate 150. It should be noted that the incorporation of the nonconductive support element 645 can help to reduce the difficulty of manufacturing an antenna structure for the mobile device 600. Furthermore, a second metal mechanism element 680 of the mobile device 600 further has a cutting retraction design 685, which is not parallel to the main portion 120 of the first metal mechanism element 110. For example, the cutting retraction design 685 may be adjacent to the second slot 690 of the second metal mechanism element 680, so as to improve the overall appearance of the mobile device 600. Other features of the mobile device 600 of FIG. 6 are similar to those of the mobile device 100 of FIG. 1. Accordingly, the two embodiments can achieve similar levels of performance.

Figure 7:
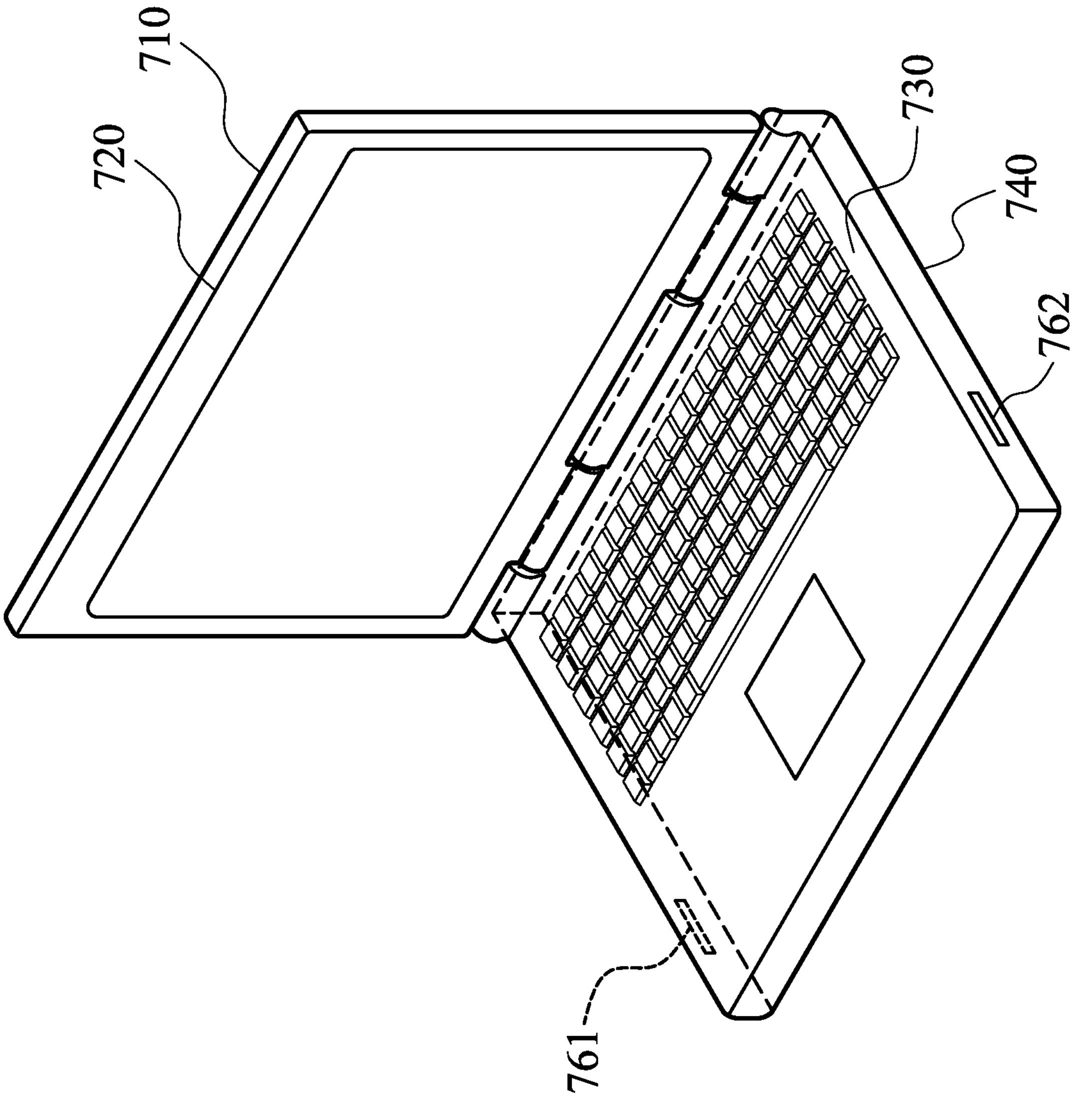
FIG. 7 is a perspective view of a notebook computer according to an embodiment of the invention.

FIG. 7 is a perspective view of a notebook computer 700 according to an embodiment of the invention. In the embodiment of FIG. 7, the aforementioned antenna structure is applied to the notebook computer 700. The notebook computer 700 includes an upper cover housing 710, a display frame 720, a keyboard frame 730, and a base housing 740. It should be understood that the upper cover housing 710, the display frame 720, the keyboard frame 730, and the base housing 740 are respectively equivalent to the so-called "A-component", "B-component", "C-component", and "D-component" in the field of notebook computers. For example, the aforementioned antenna structure may be disposed at a first position 761 or a second position 762 of the notebook computer 700. According to practical measurements, if the aforementioned antenna structure is disposed at the first position 761 or the second position 762, the notebook computer 700 will tend to meet the general requirements of SAR (Specific Absorption Rate).

The invention proposes a novel mobile device with a novel antenna structure. In comparison to the conventional design, the invention has several advantages, including its small size, wide bandwidth, high structural rigidity, low manufacturing cost, and improved SAR. Therefore, the invention is suitable for application in a variety of communication devices.

Note that the above element sizes, element shapes, and frequency ranges are not limitations of the invention. An antenna designer can fine-tune these settings or values to meet different requirements. It should be understood that the mobile device of the invention is not limited to the configurations of FIGS. 1-7. The invention may merely include any one or more features of any one or more embodiments of FIGS. 1-7. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a first metal mechanism element, comprising a main portion and a sidewall portion, wherein the sidewall portion has a first slot;

a dielectric substrate, disposed adjacent to the sidewall portion of the first metal mechanism element;

a first feeding radiation element, coupled to a feeding point, and extending across the first slot of the first metal mechanism element;

a second feeding radiation element, coupled to the feeding point, and extending across the first slot of the first metal mechanism element, wherein the first feeding radiation element and the second feeding radiation element are disposed on the dielectric substrate;

a ground element, coupled to the main portion of the first metal mechanism element, wherein an antenna structure is formed by the first slot of the first metal mechanism element, the dielectric substrate, the first feeding radiation element, the second feeding radiation element, and the ground element; and a second metal mechanism element, disposed opposite to the main portion of the first metal mechanism element, wherein the second metal mechanism element has a second slot;

wherein the first feeding radiation element comprises a first segment coupled to the feeding point, and a second segment coupled to the first segment;

wherein the second feeding radiation element comprises a third segment coupled to the feeding point, and a fourth segment coupled to the third segment;

wherein a combination of the first segment and the third segment has a V-shape.

2. The mobile device as claimed in claim 1, wherein the first slot of the first metal mechanism element is a first closed slot.

3. The mobile device as claimed in claim 2, wherein the second slot of the second metal mechanism element is a second closed slot.

4. The mobile device as claimed in claim 3, wherein the first closed slot and the second closed slot are substantially parallel to each other.

5. The mobile device as claimed in claim 1, wherein an angle is formed between the first feeding radiation element and the second feeding radiation element.

6. The mobile device as claimed in claim 5, wherein the angle is from 30 to 90 degrees.

7. The mobile device as claimed in claim 1, wherein the antenna structure covers a first frequency band, a second frequency band, and a third frequency band.

8. The mobile device as claimed in claim 7, wherein the first frequency band is from 2400 MHz to 2500 MHz, the second frequency band is from 5150 MHz to 5850 MHz, and the third frequency band is from 5925 MHz to 7125 MHz.

9. The mobile device as claimed in claim 7, wherein a length of the first slot of the first metal mechanism element is substantially equal to 0.5 wavelength of the first frequency band.

10. The mobile device as claimed in claim 7, wherein a length of the second slot of the second metal mechanism element is substantially equal to 0.5 wavelength of the first frequency band.

11. The mobile device as claimed in claim 7, wherein a length of the first feeding radiation element is substantially equal to 0.25 wavelength of the third frequency band.

12. The mobile device as claimed in claim 7, wherein a length of the second feeding radiation element is substantially equal to 0.25 wavelength of the third frequency band.

13. The mobile device as claimed in claim 1, further comprising:

a nonconductive support element, filling the first slot of the first metal mechanism element, wherein the nonconductive support element is configured to carry the dielectric substrate.

14. The mobile device as claimed in claim 1, wherein the second metal mechanism element further has a cutting retraction design.

15. The mobile device as claimed in claim 14, wherein the cutting retraction design of the second metal mechanism element is not parallel to the main portion of the first metal mechanism element.

16. The mobile device as claimed in claim 1, wherein a first obtuse angle is formed between the first segment and the second segment.

17. The mobile device as claimed in claim 1, wherein a second obtuse angle is formed between the third segment and the fourth segment.

* * * * *